Patented Oct. 8, 1940

2,216,757

UNITED STATES PATENT OFFICE 2,216,757

ALKALI ACTIVATION OF BLACK LIQUOR

George H. Scheffler, Wilmington, Del., assignor to Darco Corporation, Wilmington, Del., a corporation of Delaware No Drawing. Application March 21, 1939, Serial No. 263,205

6 Claims. (Cl. 252—3)

This invention relates to activated carbon and to the process of making the same, and more particularly to activated carbon produced by the activation of the by-product of the soda paper-making process, which is known in the art as black liquor, with an alkali hydroxide.

The principal object of this invention is the production of activated carbon of very high decolorizing activity from black liquor by activation of the same at relatively low temperatures by means of an alkali hydroxide.

Another object is the provision of a process for the production of activated carbon which involves activation of the organic carbon compounds contained in black liquor by means of added alkali hydroxide in amounts at least equal to the weight of organic solids contained in the black liquor.

Another object is the provision of a process for the production of activated carbon which involves carbonizing the organic constituents of black liquor and simultaneously activating the carbon as it is formed by means of an alkali hydroxide intimately admixed throughout the black liquor prior to carbonization in amounts at least equal to the weight of organic solids contained therein.

Another object is the provision of a new product, namely activated carbon produced in accordance with the process described herein, said product having extremely high decolorizing power.

Other objects will more fully hereinafter appear.

In the soda process for making paper, the wood is digested at an elevated temperature and under an elevated pressure with an aqueous solution of sodium hydroxide for a period of time to dissolve the non-cellulose components and thereby liberating the cellulose, whereupon the cellulose pulp is separated from the aqueous liquor (known as black liquor) and is washed to remove traces thereof. The non-cellulose components of the wood such as lignin, resins, etc., have combined with the caustic soda, or have been decomposed by the caustic soda, to form water-soluble compounds. As a consequence considerable of the sodium hydroxide is neutralized and nearly all or all of the balance is converted to sodium carbonate during the digestion so that the resulting black liquor contains no or only very small amounts of free caustic. In the usual process the black liquor is first evaporated to about 38° Bé., is then calcined and the black ash thus obtained is leached to recover the soda therefrom, leaving a carbonaceous material known as black-ash residue.

It has heretofore been proposed to employ this black-ash residue, either with or without acid-washing to remove the alkaline ingredients therefrom, as a decolorizing carbon, but its decolorizing activity is very low. It has also been proposed to carry out the calcination of the black-liquor at low temperature such as 300° C. rather than at the red-heat commonly employed, but this product has little or no adsorbing or decolorizing activity and therefore is not an activated carbon in the sense in which that term is understood in this art. In addition to the foregoing proposals, it has been proposed to subject the incinerated residue of carbon and sodium compounds, known as black-ash, to activation at a temperature above 600° C. with a carbon-oxidizing gas such as steam, followed by leaching out of the sodium carbonate with water, whereby activated carbon is produced.

This invention comprehends the discovery that a very highly activated carbon can be produced by the addition of an alkali hydroxide such as sodium or potassium hydroxide to black-liquor or to evaporated black-liquor, in amounts such that the ratio of alkali hydroxide to organic solids in the black liquor is at least 2 to 1, and by calcination of the mixture at a temperature of 500° C. to 600° C. preferably in a closed retort so as to avoid undue oxidation of carbon and undue transformation of the activating agent alkali hydroxide to alkali carbonate which is not a chemical activating agent.

Thus it will be seen that this invention contemplates chemical activation of the black liquor by means of an alkali metal hydroxide at a relatively low temperature (500–600° C.) as distinguished from activation by means of steam or other carbon-oxidizing gas at relatively high temperatures. As a consequence the yield of the present process is many times greater than the yield of such steam activation since steam activation operates by destruction of a substantial proportion of the carbon whereas the present process, if carried out properly, is capable of yielding activated carbon in an amount very close to the theoretical carbon content of the starting material and involves the loss of very little carbon.

In carrying out the process of the invention, black liquor either in the form of the dilute solution as obtained from the paper-making process, or in more concentrated form up to the most highly concentrated liquor, or in the form of the evaporated solids, though preferably in the form of a liquid, is admixed with an alkali metal hydroxide, say sodium hydroxide, in such amounts that the ratio of free alkali hydroxide to total organic solids in the black liquor is at least 2 to 1. Preferably the mixture is agitated in order to secure uniformity. Water may be added to the mixture in an amount sufficient to produce a fluid mass and to bring about homogeneity as readily as possible. It is particularly desirable to add water in such amounts in the case where the more concentrated forms of black liquor, or the solid evaporated form, is employed. While the addition of water may in all cases be dispensed with, if deemed desirable, the activity of the product will suffer to some extent if the water is entirely omitted. On the other hand, the presence of a great excess of water in the mixture is not only unnecessary but also is undesirable because it requires the application of an uneconomical amount of heat in the subsequent calcination to eliminate it so that carbonization and activation can proceed.

The aqueous mixture of black liquor solids and alkali hydroxide is now raised to a temperature of 500–600° C. for carbonization and activation. This is preferably carried out in the substantial absence of air or other oxidizing gas, as by conducting this operation in a closed furnace. Before temperatures of the order of 500–600° C. are reached the water present in the mixture will of course have evaporated. The time required to reach a temperature within this range will vary with the amount of water originally present and with the type of heating equipment which is available.

The activation may be carried out by bringing the mass to 500° C. or to some temperature between 500 and 600° C. and holding it at that temperature until the reaction is completed, as indicated by the cessation of liberation of combustible gases therefrom. This will usually require about 15 minutes. The mass may be held at this temperature for a longer period, say ½ hour or even one hour or longer, in order to assure complete reaction.

As indicated, the mass is calcined out of substantial contact with air so as to avoid appreciable oxidation which would result in a diminished yield of carbon and which would result in the formation of carbon dioxide which would react with free sodium hydroxide converting it into sodium carbonate which possesses no activating power, thereby lowering the effective ratio of sodium hydroxide to organic carbon compounds and to nascent carbon. In addition, it is desirable that transformation of sodium hydroxide into sodium carbonate be as small as possible in order to minimize the expense of causticizing the sodium carbonate back to sodium hydroxide for reuse in either the digestion of wood or in the activation of subsequent batches of black liquor.

After completion of the activation the mass is allowed to cool down preferably at least to 100° C. whereupon it is washed first with water to remove the greater part of the sodium hydroxide and sodium carbonate from the residue, then with dilute hydrochloric acid to remove the last traces of alkali compounds and then with water to remove the hydrochloric acid.

Instead of following the usual procedure in the production of activated carbon wherein the washed wet carbon is dried at relatively low temperatures, say up to 140° C., to remove the water therefrom, it has been found essential not to dry the carbon of the present invention by heating since attempts to remove water by drying at temperatures above 40° C. result in a substantial or complete loss of decolorizing activity. The product as obtained from washing will contain water in amounts varying from about 50 to 80% of the weight of the carbon and it is preferred to maintain the water content of the product at this level until the product is used. Consequently in this specification where the decolorizing activity of the product is given it is to be understood that it is the activity of the wet product. However, the figures for activity given in the examples are computed with reference to the actual carbon content of the product and disregarding its water content.

The product of the invention is therefore generally in the form of the water-containing mass of activated carbon thus obtained. If desired, the water may be removed by methods which do not involve heating the carbon to an elevated temperature to remove the water, although even such methods or any method of removing water result in a lowering of the relative efficiency of the product, to some extent. Such methods include drying at ordinary temperature with dehydrated air or other gas, by vacuum drying at room temperature or at lower temperature, or by the use of a water-miscible, readily volatile solvent such as methyl or ethyl alcohol, or the water in the mass may be displaced by other liquids such as methyl or ethyl alcohol, glycerine or even non-miscible organic liquids such as petroleum oil, kerosene, or the like.

As the ratio of alkali metal hydroxide to organic content of the black liquor is increased above about 2.6 to 1 the activity of the product diminishes somewhat until at a ratio of 12 to 1 it has dropped off to about 200. The activity reaches a maximum at a ratio in the neighborhood of 2.5 to 3.0, say 2.6, and is lower at ratios either above or below this figure.

An important advantage of the invention is the high yields of product which it makes possible. In many cases the yield is almost equal to the theoretical carbon content of the black liquor. In almost every case it is at least 35% based on the total organic matter present in the black liquor, whereas the theoretical carbon content of the black liquor usually varies from approximately 35 to 50%.

Below are given a number of examples of various modes of activating black liquor with an alkali hydroxide. However, these examples are not to be construed as limiting the invention, which is to be limited only as set forth in the appended claims.

*Example 1*

To 113 gms. of black liquor having the composition given below and containing 10.3 gms. of organic matter and 2.6 gms. of NaOH were added 30.0 gms. of solid NaOH. The ratio of free alkali to organic matter in the mixture was therefore 3.16 to 1. The mixture was placed in a closed iron retort which had a small vent-pipe to allow escape of liberated gases, and was heated to 500° C. in one and one-half hours and held at 500° C. for one-half hour. The carbon was then cooled to room temperature, washed, ground and neutralized with acid to a pH of about 6.5. The resulting slurry was filtered to remove excess water. The product contained 60.12% water. The carbon content of the product had a molasses decolorizing relative efficiency of 300.

The black liquor employed in this example consisted of 81.4% $H_2O$ and 18.6% solids. The solids fraction of the liquor consisted of 9.07% organic material (mainly lignin) and 2.30% free alkali as NaOH and 7.23% $Na_2CO_3$ which percentages add up to 18.6%. The free alkali present in the amount of black liquor taken was therefore 2.6 grams.

*Example 2*

This example was exactly like Example 1 except that 24.0 gms. of NaOH were added to the black liquor. This made a ratio of NaOH to organic matter of 2.58 to 1. The product contained 68.07% of water. The carbon content of the product had a molasses decolorizing relative efficiency of 545.

*Example 3*

This example was exactly like Example 1 except that 80.0 grams of NaOH were added to the black liquor, which made a ratio of NaOH to organic matter of 8.0 to 1. The product contained 65.0% of water. The carbon content of the product had a relative efficiency of 290.

*Example 4*

This example was exactly like Example 1 except that 60.0 grams of NaOH were added to the black liquor. This made a ratio of NaOH to organic content of the black liquor of 6.08 to 1.0. The product contained 60.0% of water and its carbon content had a relative efficiency of 330.

*Example 5*

This example was exactly like Example 1 except that 17.0 gms. of NaOH were added to the black liquor which gave a ratio of NaOH to organic matter of 1.90 to 1. The product contained 61.2% of water, and its carbon content had a relative efficiency of 20.

*Example 6*

To 321 grams of black liquor consisting of 47.0% $H_2O$ and 53.0% solids, the latter consisting of 20.3% ash with no free alkali, and 32.7% organic matter (chiefly lignin), were added 260.0 gms. of solid NaOH. The ratio of free alkali to organic matter in the liquor was 2.46 to 1. The resulting mixture was placed in a closed iron retort which had a small vent to allow escape of gases liberated during heating, was heated to 500° C. in one and one-half hours, and was held at 500° C. for one-half hour. The product was cooled to room temperature, washed, ground and neutralized to a pH of about 6.7. The resulting slurry was filtered to remove the excess water. The product contained 73.2% water and its carbon content had a relative efficiency of 415.

*Example 7*

This example was identical with Example 6 except that 150 gms. of NaOH were added to the black liquor which gave a ratio of NaOH to organic matter of 1.42 to 1. The product contained 50.3% of water and its carbon content had a molasses decolorizing relative efficiency of 33.5 at 50% decolorization but had a decolorizing relative efficiency of 0 at 90% decolorization.

*Example 8*

To 218.24 gms. of black liquor containing 88.3% water and 11.7% solids, the latter being made up of 9.4% of inert (chiefly $Na_2CO_3$) and 2.3% of organic material (chiefly lignin), the black liquor containing no free alkali, were added 60 gms. of solid NaOH. The ratio of NaOH to organic material was 11.95 to 1. The mixture was then calcined in the same manner as in Examples 1 and 6, the calcined material being treated in the same manner also. The product contained 69.5% of water and its carbon content had a relative efficiency of 205.

While the foregoing description relates to the use of sodium hydroxide as the activating agent, it is of course to be understood that where found desirable the sodium hydroxide may be replaced by equivalent amounts of other alkali metal hydroxides such as potassium hydroxide or even lithium hydroxide. However, by reason of the greater cost of potassium hydroxide and of the still greater cost of lithium hydroxide, in the majority of cases it will be preferred to employ sodium hydroxide.

In this specification by the term "R. E." or "relative efficiency," unless otherwise specified, I refer to the molasses decolorizing activity at 90% decolorization, determined in the manner fully described in U. S. Patent No. 2,146,024, to Verner A. McCullough.

Having described my invention, what I claim is:

1. In a process of producing activated carbon from black liquor the step which comprises calcining a mixture of black liquor and an alkali metal hydroxide, in such proportions that the ratio of alkali metal hydroxide to organic solids in the black liquor is at least 2 to 1, to a temperature of from 500 to 600° C.

2. In a process of producing activated carbon from black liquor the step which comprises calcining a mixture of black liquor and an alkali metal hydroxide in such proportions that the ratio of alkali metal hydroxide to organic solids in the black liquor is in the neighborhood of 2.5 to 3.0 to 1, to a temperature of from 500 to 600° C.

3. In a process of producing activated carbon from black liquor the step which comprises calcining a mixture of black liquor and an alkali metal hydroxide in such proportions that the ratio of alkali metal hydroxide to organic solids in the black liquor is at least 2 to 1, to a temperature of from 500 to 600° C. for a period of time of at least 15 minutes.

4. In a process of producing activated carbon from black liquor the step which comprises calcining a mixture of black liquor, an alkali metal hydroxide and a sufficient amount of water to produce a readily flowing mass, the alkali metal hydroxide being employed in such proportions that the ratio of alkali metal hydroxide to organic solids in the black liquor is at least 2 to 1, to a temperature of from 500 to 600° C.

5. In a process of producing activated carbon from black liquor the steps which comprise calcining a mixture of black liquor and an alkali metal hydroxide, in such proportions that the ratio of alkali metal hydroxide to organic solids in the black liquor is at least 2 to 1, to a temperature of from 500 to 600° C. and maintaining said mixture out of substantial contact with air throughout said calcination.

6. A process of producing activated carbon from black liquor which comprises calcining a mixture of black liquor and an alkali metal hydroxide, in such proportions that the ratio of alkali metal hydroxide to organic solids in the black liquor is at least 2 to 1, to a temperature of from 500 to 600° C., cooling the resulting material, washing the carbon with water, and maintaining the water content of the carbon at at least 50% until time for use.

GEORGE H. SCHEFFLER.